United States Patent
Cymbal et al.

(10) Patent No.: US 10,760,618 B2
(45) Date of Patent: Sep. 1, 2020

(54) STEERING CLAMP YOKE

(71) Applicant: STEERING SOLUTIONS IP HOLDING CORPORATION, Saginaw, MI (US)

(72) Inventors: William D. Cymbal, Freeland, MI (US); Joseph R. Streng, Freeland, MI (US); Steven R. Burk, Frankenmuth, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 317 days.

(21) Appl. No.: 15/820,130

(22) Filed: Nov. 21, 2017

(65) Prior Publication Data

US 2018/0142737 A1    May 24, 2018

Related U.S. Application Data

(60) Provisional application No. 62/425,660, filed on Nov. 23, 2016.

(51) Int. Cl.
*F16D 3/38*    (2006.01)
*F16D 1/08*    (2006.01)

(52) U.S. Cl.
CPC .......... *F16D 3/387* (2013.01); *F16D 1/0864* (2013.01); *Y10T 24/1441* (2015.01); *Y10T 403/7188* (2015.01)

(58) Field of Classification Search
CPC .... F16D 3/387; F16D 1/0864; Y10T 24/1441; Y10T 403/7188
USPC ............... 464/134, 135, 182; 403/236, 399; 24/279
See application file for complete search history.

(56) References Cited

U.S. PATENT DOCUMENTS

| | | | | |
|---|---|---|---|---|
| 1,373,673 A | * | 4/1921 | Ritter | F16L 33/04 24/279 |
| 5,090,833 A | * | 2/1992 | Oertle | B62D 1/20 |
| D442,006 S | * | 5/2001 | Miller | |
| 10,119,575 B2 | * | 11/2018 | Nakamura | F16D 3/26 |

* cited by examiner

*Primary Examiner* — Greg Binda
(74) *Attorney, Agent, or Firm* — Dickinson Wright PLLC

(57) ABSTRACT

A steering clamp yoke includes a first side surface and a second side surface. The first side surface has a first surface segment and a second surface segment that is disposed in a non-parallel relationship with the first surface segment. The non-parallel relationship between the second surface segment and the first surface segment enables a bolt that is inserted into a bolt hole of the steering clamp yoke to contact both sides of the bolt hole to reduce or minimize bolt bending.

7 Claims, 2 Drawing Sheets

STEERING CLAMP YOKE

CROSS-REFERENCES TO RELATED APPLICATIONS

This patent application claims priority to U.S. Provisional Patent Application Ser. No. 62/425,660, filed Nov. 23, 2016, which is incorporated herein by reference in its entirety.

BACKGROUND OF THE PRESENT DISCLOSURE

A clamp yoke may be provided with a steering column shaft or a pinion shaft of a motor vehicle. The clamp yoke transmits a steering torque to a pinion. A bolt is inserted into a bolt hole of the clamp yoke and as a torque is applied to the bolt head, the bolt head contacts a yoke surface and the yoke deforms and secures the clamp yoke to the shaft. The moment arms of bending may reduce the amount of clamp force applied by the clamp yoke to the mating shaft.

SUMMARY OF THE PRESENT DISCLOSURE

According to an embodiment of the present disclosure, a steering clamp yoke is provided. The steering clamp yoke includes a first side surface and a second side surface. The first side surface has a first surface segment and a second surface segment that is disposed in a non-parallel relationship with the first surface segment. The second side surface is disposed opposite the first side surface. The second surface segment is disposed in a non-parallel relationship with the second side surface.

In addition to one or more of the features described herein, an edge is defined between the first surface segment and the second surface segment.

In addition to one or more of the features described herein, a bolt hole extends from the first side surface, through the edge, to the second side surface.

In addition to one or more of the features described herein, a first surface extending between distal ends of the first side surface and the second side surface; a second surface disposed opposite the first surface and extending between proximal ends of the first side surface and the second side surface; and a first end surface extending between the first side surface, the second side surface, the first surface, and the second surface.

In addition to one or more of the features described herein, the second surface segment becomes progressively closer to the second side surface in a direction that extends from the first surface towards the second surface.

In addition to one or more of the features described herein, the edge extends from proximate a first junction that is defined proximate an intersection between the first surface, the first surface segment, and the second surface segment and extending towards a second junction that is defined proximate an intersection between the first end surface, the first surface segment, and the second surface segment.

According to another embodiment of the present disclosure, a shaft assembly is provided. The shaft assembly includes a steering clamp yoke having a first side surface and a second side surface. The first side surface has a first surface segment and a second surface segment that extends from the first surface segment. The second side surface is disposed opposite the first side surface. The second surface segment is disposed in a non-parallel relationship with the first surface segment and the second side surface.

In addition to one or more of the features described herein, a first surface extending between distal ends of the first side surface and the second side surface; and a first end surface extending between the first side surface, the second side surface, and the first surface.

In addition to one or more of the features described herein, the steering clamp yoke defines a bore that extends from the first end surface towards a second end surface that is disposed opposite the first end surface.

In addition to one or more of the features described herein, a shaft is at least partially received within the bore.

In addition to one or more of the features described herein, an edge is defined between the first surface segment and the second surface segment.

In addition to one or more of the features described herein, a bolt hole extends from the first side surface, through the edge, to the second side surface.

In addition to one or more of the features described herein, a first bolt contact area is disposed proximate a first edge of the bolt hole and extends between the first surface segment, and the second surface segment along the edge in a first direction.

In addition to one or more of the features described herein, a second bolt contact area is disposed proximate a second edge of the bolt hole and extends between the first surface segment and the second surface segment along the edge in a second direction that is disposed opposite the first direction.

In addition to one or more of the features described herein, a bolt having a bolt head and a bolt shank that extends from the bolt head and into the bolt hole.

In addition to one or more of the features described herein, while the bolt is in a first position, the bolt head engages the first bolt contact area and is spaced apart from the second bolt contact area.

In addition to one or more of the features described herein, while the bolt is in a second position, the bolt head engages the second bolt contact area.

In addition to one or more of the features described herein, the steering clamp yoke defines a notch that extends from the first surface towards the second surface.

In addition to one or more of the features described herein, while the bolt is in the first position, the notch has a first width.

In addition to one or more of the features described herein, while the bolt is in the second position, the notch has a second width that is less than the first width.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative examples of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
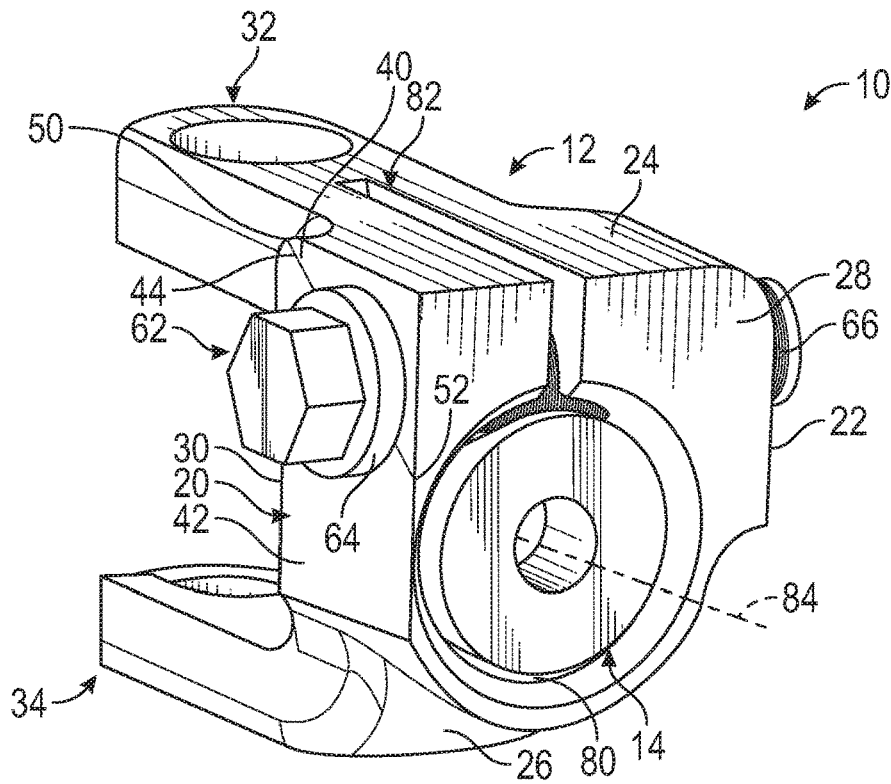
FIG. 1 is a perspective view of a clamp yoke.
Figure 2:
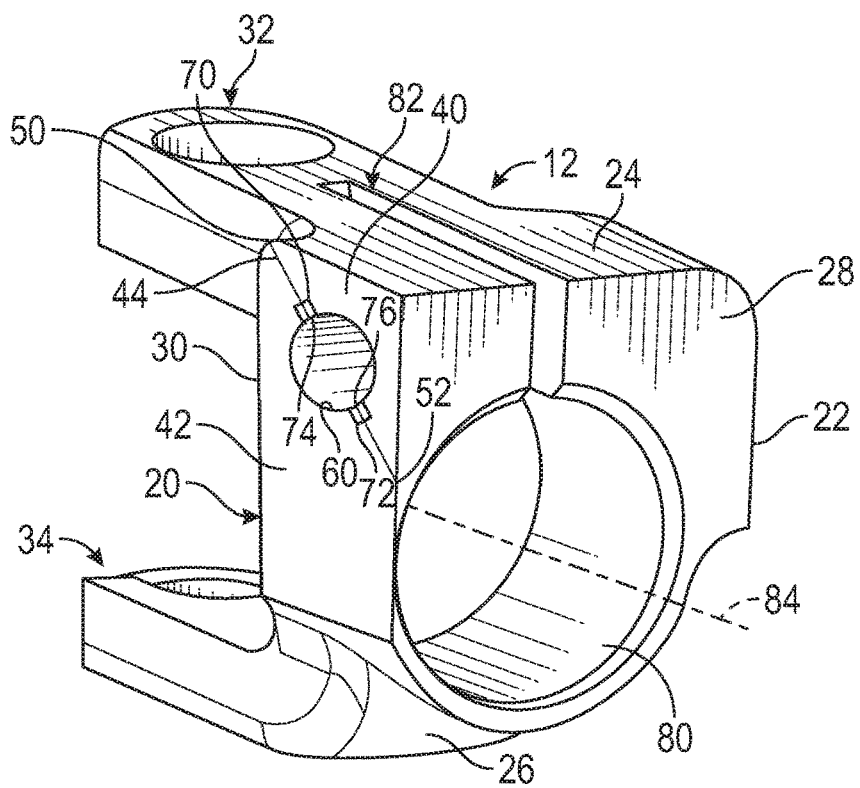
FIG. 2 is a perspective view of a shaft assembly having the clamp yoke.

Referring to FIGS. 1 and 2, a shaft assembly 10 is shown. The shaft assembly 10 may be provided to interconnect portions of a steering system, such as a steering shaft assembly, to a steering gear or steering mechanism. The shaft assembly 10 includes a steering clamp yoke 12 and a shaft 14.

The steering clamp yoke 12 includes a first side surface 20, a second side surface 22, a first surface 24, a second surface 26, a first end surface 28, and a second end surface 30. The steering clamp yoke 12 further includes a first arm 32 and a second arm 34 that is spaced apart from the first arm 32. The first arm 32 and the second arm 34 each extend away from the second end surface 30 and are arranged to connect the steering clamp yoke 12 to a steering system component such as a pinion or universal joint.

The first side surface 20 is configured as a reaction surface having surface segments that are angled relative to each other. The first side surface 20 includes a first surface segment 40 that is disposed within a first plane and a second surface segment 42 that is disposed within a second plane that is disposed in a non-perpendicular and in a non-parallel relationship with respect to the first plane, such that the second surface segment 42 extends from the first surface segment 40 and is disposed in a non-perpendicular and a non-parallel relationship with the first surface segment 40.

The first side surface 20 defines an intersection or an edge 44 that extends between the first surface segment 40 and the second surface segment 42. The edge 44 extends at least partially across the first side surface 20, starting proximate a first junction 50 that is defined proximate an intersection between the first surface 24, the first surface segment 40, and the second surface segment and extending towards a second junction 52 that is defined proximate an intersection between the first end surface 28, the first surface segment 40, and the second surface segment 42.

The steering clamp yoke 12 defines a bolt hole 60 that extends from the first side surface 20, through the edge 44, to the second side surface 22. A bolt 62 extends into the bolt hole 60 and facilitates securing the shaft 14 to the steering clamp yoke 12. The edge 44 runs through or is aligned with a centerline of the bolt 62 such that the second surface segment 42 starts to incline or decline (i.e. is angled) relative to the first surface segment 40 at the centerline of the bolt 62 and the edge 44 to minimize bending moments on the bolt 62. In at least one embodiment, the second surface segment 42 is disposed at an angle of at least 1° relative to the first surface segment 40. In at least one embodiment, the second surface segment 42 is disposed at an angle of between approximately 1°-5° relative to the first surface segment 40.

The bolt 62 includes a bolt head 64 and a bolt shank 66 that extends from the bolt head 64. The bolt shank 66 of the bolt 62 extends into the bolt hole 60. The bolt head 64 of the bolt 62 is arranged to engage at least one of a first bolt contact area 70 and/or a second bolt contact area 72 that are each defined proximate the edge 44 that extends between the first surface segment 40 and the second surface segment 42 of the first side surface 20.

The first bolt contact area 70 may be a first bolt head reaction surface that is disposed proximate a first edge 74 of the bolt hole 60 and extends between the first surface segment 40 and the second surface segment 42 along the edge 44 in a first direction that extends towards the first junction 50. The second bolt contact area 72 may be a second bolt head reaction surface that is disposed proximate a second edge 76 of the bolt hole 60 that is disposed opposite the first edge 74. The second bolt contact area 72 extends between the first surface segment 40 and the second surface segment 42 along the edge 44 in a second direction that is disposed opposite the first direction and extends towards the second junction 52.

The second side surface 22 is disposed opposite the first side surface 20. The first surface segment 40 is disposed substantially parallel to the second side surface 22. The second surface segment 42 is disposed in a non-parallel relationship with respect to the second side surface 22. The second surface segment 42 becomes progressively closer to the second side surface 22 in a direction that extends from the first surface 24 towards the second surface 26.

The first surface 24 extends between distal ends of the first side surface 20, the second side surface 22, the first end surface 28, and the second end surface 30. The first arm 32 is disposed proximate the first surface 24 and at least partially extends from the first surface 24.

The second surface 26 is disposed opposite the first surface 24. The second surface 26 extends between proximal ends of the first side surface 20, the second side surface 22, the first end surface 28, and the second end surface 30. The second arm 34 is disposed proximate the second surface 26.

The first end surface 28 extends between first ends of the first side surface 20, the second side surface 22, the first surface 24, and the second surface 26. The second end surface 30 is disposed opposite the first end surface 28. The second end surface 30 extends between second ends of the first side surface 20, the second side surface 22, the first surface 24, and the second surface 26 that are disposed opposite the first ends.

The steering clamp yoke 12 defines a bore 80 and a notch 82. The bore 80 extends from the first end surface 28 towards the second end surface 30 along a first axis 84. The notch 82 extends from the first surface 24 towards the second surface 26. The notch 82 extends into the bore 80 along an axis that is disposed substantially transverse to the first axis 84. The notch 82 may at least partially extend into the first arm 32.

The shaft 14 may be a pinion shaft that is at least partially received within the bore 80 the steering clamp yoke 12 along the first axis 84. The shaft 14 is secured to the steering clamp yoke 12 by the bolt 62. The shaft 14 may define a shaft notch that is disposed proximate the end of the shaft 14 that is received within the steering clamp yoke 12. The bolt shank 66 of the bolt 62 may be received by the shaft notch when the bolt 62 is inserted into the bolt hole 60.

Figure 3:
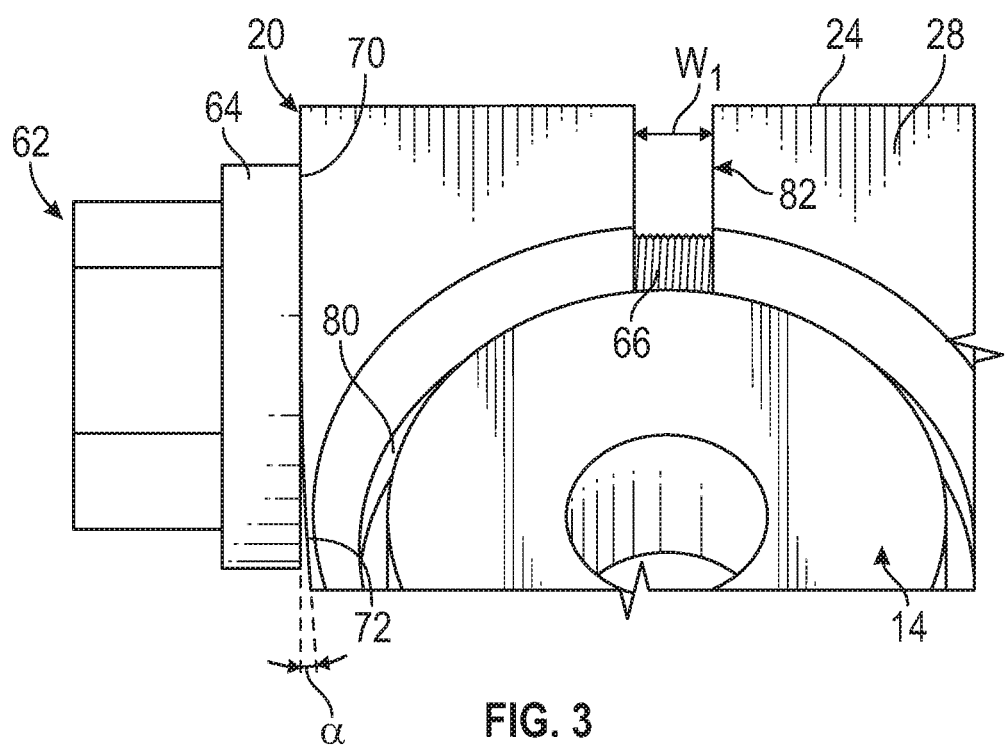
FIG. 3 is a partial view of the clamp yoke in a first position prior to torque application.

Referring to FIG. 3, the bolt 62 may be inserted into the bolt hole 60 of the steering clamp yoke 12. Prior to a torque being applied to the bolt 62, the bolt 62 may be in a first position in which the bolt head 64 engages the first bolt contact area 70 and the bolt head 64 is spaced apart from the second bolt contact area 72. The bolt head 64 may be spaced apart from the second bolt contact area 72 of the first side surface 20 due to the angle, α, between an underside of the bolt head 64 and the first side surface 20. Prior to a torque being applied to the bolt 62, the notch 82 may have a first width, w1.

Figure 4:
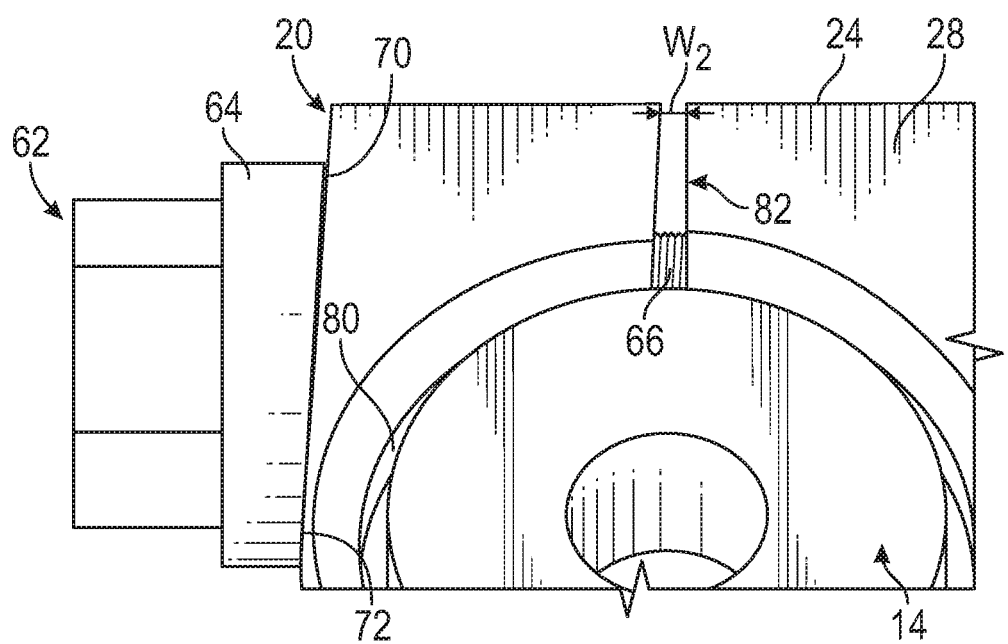
FIG. 4 is a partial view of the clamp yoke in a second position after torque application.

Referring to FIG. 4, subsequent to a torque being applied to the bolt 62, the bolt 62 may be in a second position in which the bolt head 64 engages the second bolt contact area 72. In the embodiment shown, the bolt head 64 may be spaced apart from the first bolt contact area 70 by a small gap. In at least one embodiment, the bolt head 64 engages both the second bolt contact area 72 and the first bolt contact area 70 increasing the surface to surface contact area between the bolt head 64 and the first surface segment 40 and the second surface segment 42. Furthermore, the first surface segment 40 and the second surface segment 42 may be disposed generally parallel to each other while the bolt 62 is in the second position. Subsequent to a torque being applied to the bolt 62, the notch 82 may have a second width, w2, which is less than the first width, w1.

The non-parallel relationship between the second surface segment 42 and the first surface segment 40, due to the edge 44, enables the bolt 62, during torque application, to exert a force (clamp load) straight down the centerline of the bolt 62. The clamp load being applied at the centerline of the bolt 62 aids in minimizing bolt bending. Furthermore, the non-parallel relationship between the second surface segment 42 and the first surface segment 40 enables the bolt head 64 of the bolt 62 to contact both sides of the bolt hole 60, via the first bolt contact area 70 and the second bolt contact area 72, to reduce or minimize bolt bending while also increasing a maximum clamp pressure on the shaft 14.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

Having thus described the present disclosure, it is claimed:

1. A steering clamp yoke comprising:
a first side surface having a first surface segment and a second surface segment that is disposed in a non-parallel relationship with the first surface segment, wherein an edge is defined between the first surface segment and the second surface segment;
a second side surface disposed opposite the first side surface, the second surface segment being disposed in a non-parallel relationship with the second side surface, wherein a bolt hole extends from the first side surface, through the edge, to the second side surface, wherein the second surface segment becomes progressively closer to the second side surface in a direction that extends from the first surface towards the second surface;
a first surface extending between distal ends of the first side surface and the second side surface;
a second surface disposed opposite the first surface and extending between proximal ends of the first side surface and the second side surface; and
a first end surface extending between the first side surface, the second side surface, the first surface, and the second surface.

2. A steering clamp yoke comprising:
a first side surface having a first surface segment and a second surface segment that is disposed in a non-parallel relationship with the first surface segment, wherein an edge is defined between the first surface segment and the second surface segment;
a second side surface disposed opposite the first side surface, the second surface segment being disposed in a non-parallel relationship with the second side surface, wherein a bolt hole extends from the first side surface, through the edge, to the second side surface, wherein the edge extends from proximate a first junction that is defined proximate an intersection between the first surface, the first surface segment, and the second surface segment and extending towards a second junction that is defined proximate an intersection between the first end surface, the first surface segment, and the second surface segment;
a first surface extending between distal ends of the first side surface and the second side surface;
a second surface disposed opposite the first surface and extending between proximal ends of the first side surface and the second side surface; and
a first end surface extending between the first side surface, the second side surface, the first surface, and the second surface.

3. A shaft assembly comprising:
a steering clamp yoke comprising:
a first side surface having a first surface segment and a second surface segment that extends from the first surface segment, and
a second side surface disposed opposite the first side surface, the second surface segment is disposed in a non-parallel relationship with the first surface segment and the second side surface;
a first surface extending between distal ends of the first side surface and the second side surface; and
a first end surface extending between the first side surface, the second side surface, and the first surface, wherein the steering clamp yoke defines a bore that extends from the first end surface towards a second end surface that is disposed opposite the first end surface;
a shaft that is at least partially received within the bore defined by the steering clamp yoke, wherein an edge is defined between the first surface segment and the second surface segment, wherein a bolt hole extends from the first side surface, through the edge, to the second side surface, wherein a first bolt contact area is disposed proximate a first edge of the bolt hole and extends between the first surface segment, and the second surface segment along the edge in a first direction, wherein a second bolt contact area is disposed proximate a second edge of the bolt hole and extends between the first surface segment and the second surface segment along the edge in a second direction that is disposed opposite the first direction;
a bolt having a bolt head and a bolt shank that extends from the bolt head and into the bolt hole, wherein while the bolt is in a first position, the bolt head engages the first bolt contact area and is spaced apart from the second bolt contact area.

4. The shaft assembly of claim 3, wherein while the bolt is in a second position, the bolt head engages the second bolt contact area.

5. The steering clamp yoke of claim 4, wherein the steering clamp yoke defines a notch that extends from the first surface towards the second surface.

6. The shaft assembly of claim 5, wherein while the bolt is in the first position, the notch has a first width.

7. The shaft assembly of claim 6, wherein while the bolt is in the second position, the notch has a second width that is less than the first width.

* * * * *